I. W. LITTLE.
Rein-Holders.
No. 156,642.            Patented Nov. 10, 1874.
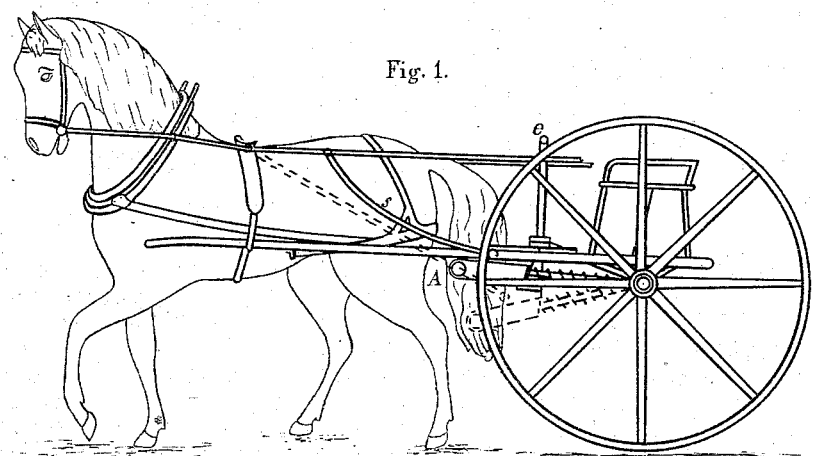
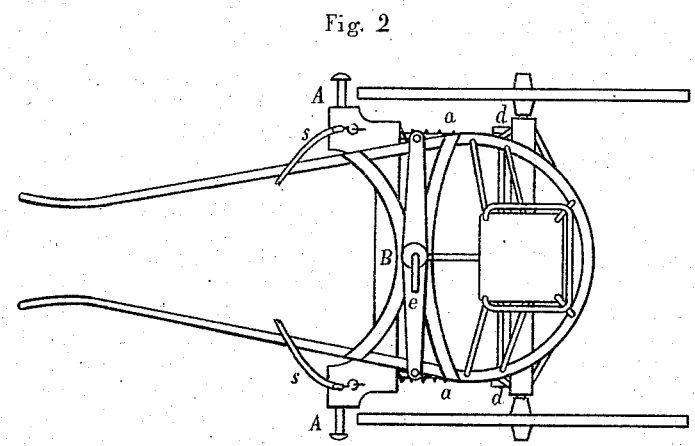
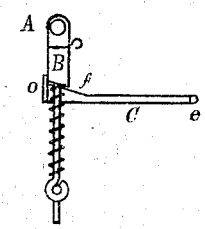
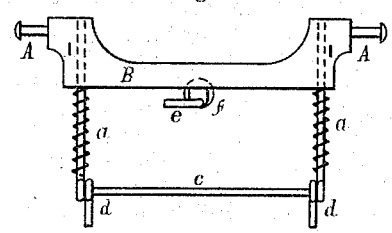
Witnesses:
Geo. E. Browne
John C. Cook, Jr.
Inventor:
Isaac W. Little
per Edw. Dummer Att.

UNITED STATES PATENT OFFICE.

ISAAC W. LITTLE, OF NEWBURY, MASSACHUSETTS.

IMPROVEMENT IN REIN-HOLDERS.

Specification forming part of Letters Patent No. 156,642, dated November 10, 1874; application filed July 23, 1874.

*To all whom it may concern:*

Be it known that I, ISAAC W. LITTLE, of Newbury, State of Massachusetts, have invented a Device for Holding Horses, of which the following is a specification:

My invention consists in a device by which brakes, rubbers, or friction-bearings shall be so caused to press upon the rims of the forward wheels of a carriage and to move with them that, being connected with the reins, when it is desired that the horse shall stand, the reins shall be drawn, and the more the horse endeavors to go forward the more will the reins draw him backward, and also such an arrangement of parts that said brakes shall be easily raised from and dropped on the wheels by a person in the carriage.

Figure 1 illustrates my invention, and shows the device in position and connection with the reins. Fig. 2 is a plan of so much of Fig. 1 as is necessary for illustration. Fig. 3 shows parts of the attachment separated from the carriage. Fig. 4 is an end view of Fig. 3.

A A are the brakes, rubbers, or friction-bearings. These are connected and made as one rigid piece by the cross-bar B. It will be noticed that the bar B is out of the way, being under the whiffletree and bar which braces the shafts. The cross-bar B can be moved toward and from the axle-tree of the carriage sufficiently to raise the brake-frame or allow them to press upon the wheels, and is guided by and slides upon the rods $a\ a$. These rods are pivoted near the axle-tree, so that they, with the bar B, can move in the direction of the revolution of the wheels. The rods $a\ a$ are provided with eyes at their ends, through which a horizontal rod, $c$, is passed, and which also passes through the eyes of bolts or staples $d\ d$, fastened to the axle-tree, as shown. Spiral springs wind about the rods $a\ a$, and are so fastened to the bar B, and at the other ends of the rods, that they will draw the bar B toward the axle-tree, thus causing the brakes to press upon the wheels. C is a vertical rod or shaft, upon which the whiffletree is pivoted, as shown, and which has, at the upper end, the lever $e$, in a convenient position to be grasped by the hand, and at the lower end the cam $f$. This cam is constructed substantially as shown, so that when one side rests against the cross-bar B the latter holds the brakes from the wheels, but when another side is turned toward the bar the brakes are free to be drawn to the wheels by the springs. There is a lip, $o$, at the lower edge of the cam to hold up the bar B, and extends so far around the cam and in such a manner as to draw the bar up against the shafts, but not so far around but that the bar B may drop down when the brakes are on. Straps $s\ s$ are fastened to the reins, and, as is deemed best, back of the saddle, and also fastened to the bar B by hooks, as shown, or in an equivalent manner. The straps $s\ s$ are intended to be quite slack when the horse is being driven, so as not to be in the way.

The operation of the device is quite simple. The cam being so set as to hold the brakes away from the wheels and hold the bar B up against the shafts, when it is desired to hold the horse, the cam is turned by means of the shaft C and lever $e$, and the brakes are drawn to the wheels, so that when the horse endeavors to go forward the brakes move with the wheels, and the reins are drawn by the straps $s\ s$.

The dotted lines in Fig. 1 show the position of the parts when the horse is being held. Furthermore, it is designed, if necessary, to have such elasticity to the straps $s\ s$ that the cross-bar and brakes may pass under the wheels and trig them.

The utility of the device is obvious, for hitching-posts are not always at hand, and weights are troublesome and not secure, and my device is very quickly operated, and furnishes a very safe fastening.

I claim as my invention—

1. The brakes A A, to swing about centers at or near the axis of the wheels and be drawn to the wheels by springs, in combination with the straps $s\ s$, all substantially as described.

2. The combination of the rods $a\ a$, hinged at $d\ d$, cross-bar B, and brakes A A, substantially as and for the purpose set forth.

3. The combination of the cross-bar B, brakes A A, cam $f$, shaft C, and lever $e$, substantially as and for the purpose set forth.

I. W. LITTLE.

Witnesses:
 ADA B. LITTLE,
 EDW. DUMMER.